(12) United States Patent
Agrawal et al.

(10) Patent No.: US 12,455,780 B2
(45) Date of Patent: Oct. 28, 2025

(54) DATA RECONCILIATION ARCHITECTURE FOR IMPROVED FAULT TOLERANCE

(71) Applicant: BANK OF AMERICA CORPORATION, Charlotte, NC (US)

(72) Inventors: Arpan Agrawal, McKinney, TX (US); Sachin Bansode, Madhya Pradesh (IN); Anshul Jain, Madhya Pradesh (IN); Dinesh Kumar Kanchi Sridharan, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 84 days.

(21) Appl. No.: 18/377,973

(22) Filed: Oct. 9, 2023

(65) Prior Publication Data

US 2025/0117274 A1    Apr. 10, 2025

(51) Int. Cl.
*G06F 11/07* (2006.01)
(52) U.S. Cl.
CPC ............................... *G06F 11/0757* (2013.01)
(58) Field of Classification Search
CPC ................................................. G06F 11/0757
USPC ......................................................... 714/748
See application file for complete search history.

(56) References Cited

U.S. PATENT DOCUMENTS

| | | |
|---|---|---|
| 7,120,751 B1 | 10/2006 | Endo |
| 7,613,209 B1 | 11/2009 | Nguyen |
| 9,344,751 B1 | 5/2016 | Ream |
| 11,113,287 B1 | 9/2021 | Landry |
| 11,250,056 B1 * | 2/2022 | Batsakis ............ G06F 16/2471 |
| 11,294,941 B1 * | 4/2022 | Sammer ................. G06F 9/542 |
| 2008/0159141 A1 | 7/2008 | Soukup |
| 2011/0080826 A1 | 4/2011 | Pereira |
| 2013/0007288 A1 * | 1/2013 | Olsen ...................... H04L 65/61 |
| | | 709/227 |
| 2013/0067191 A1 | 3/2013 | Mehra |
| 2014/0019728 A1 | 1/2014 | Reid |
| 2014/0156642 A1 | 6/2014 | Johnson |
| 2015/0033072 A1 * | 1/2015 | Barr .................... G06F 11/1484 |
| | | 714/15 |
| 2015/0040173 A1 | 2/2015 | Panagos |
| 2015/0043383 A1 | 2/2015 | Farkas |
| 2015/0186786 A1 | 7/2015 | Goyal |

(Continued)

*Primary Examiner* — James C Kerveros
(74) *Attorney, Agent, or Firm* — Moore & Van Allen PLLC; Gabrielle M. Carlini

(57) ABSTRACT

In conventional networked computing systems, stream-processing software is utilized to handle real-time data feeds. For example, a stream-processing software may sort incoming data feeds into data logs, which are then consumed by various application servers within the computing system. However, this consumption process is susceptible to failure as application servers often fail to consume a full payload of data comprising a particular message. As such, a need exists for a streaming architecture with improved fault tolerance. The system provided herein solves the problem via a reliable streaming process, which regularly generates partitions within a series of data lakes. As streaming data is received, the payloads are synced into the different data lakes based on metadata associated with the streaming data. The system can then perform individual quality checks on each partition of data, enabling the system to continuously monitor data quality over time.

20 Claims, 5 Drawing Sheets

(56) References Cited

U.S. PATENT DOCUMENTS

| | | |
|---|---|---|
| 2016/0139849 A1 | 5/2016 | Chaw |
| 2016/0196187 A1 | 7/2016 | Thakur |
| 2018/0150329 A1 | 5/2018 | Moudy |
| 2019/0206371 A1 | 7/2019 | Marchya |
| 2019/0258677 A1* | 8/2019 | Beedgen .............. G06F 11/3476 |
| 2019/0268393 A1 | 8/2019 | Panagos |
| 2020/0180148 A1* | 6/2020 | S Nanal ............. G05B 19/0423 |
| 2021/0011891 A1 | 1/2021 | Soza |
| 2021/0117868 A1* | 4/2021 | Sriharsha ................ G06N 20/20 |
| 2021/0218699 A1* | 7/2021 | Govil ...................... H04L 69/40 |
| 2023/0073566 A1* | 3/2023 | Sivasithambaresan ...................... H04L 67/12 |
| 2025/0077493 A1* | 3/2025 | Dany ................... G06F 21/604 |

\* cited by examiner

DATA RECONCILIATION ARCHITECTURE FOR IMPROVED FAULT TOLERANCE

BACKGROUND

In conventional networked computing systems, stream-processing software is utilized to handle real-time data feeds. For example, a stream-processing software may sort incoming data feeds into data logs, which are then consumed by various application servers within the computing system. However, this consumption process is susceptible to failure as application servers often fail to consume a full payload of data comprising a particular message. As such, a need exists for a streaming architecture with improved fault tolerance.

BRIEF SUMMARY

Systems, methods, and computer program products are provided for a data reconciliation in a streaming architecture with improved fault tolerance.

In one aspect, a system for data reconciliation in a streaming architecture is presented. The system may include at least one non-transitory storage device and at least one processor coupled to the at least one non-transitory storage device, where the processing device is configured to execute computer program code comprising computer instructions configured to cause said at least one processor to perform the following operations: identify a message stored within a data partition, where the message includes a plurality of payloads; identify, for each payload of the plurality of payloads, an offset number; determine, based on the offset numbers, that the message is incomplete; automatically initiate a request to read data from a stream-processing log, where the data includes at least one missing payload; and verify that the message is complete.

In some embodiments, executing the instructions further causes the processing device to identify a minimum offset number, a maximum offset number, and a count of total distinct offset numbers; calculate a difference between the minimum offset number and the maximum offset number; increase the calculated difference by a value; and determine that the increased calculated difference is greater than the count of total distinct offset numbers.

In some embodiments, executing the instructions further causes the processing device to identify at least one missing offset number.

In some embodiments, the at least one missing payload is associated with the at least one missing offset number.

In some embodiments, executing the instructions further causes the processing device to store the data from the stream-processing log within the data partition.

In some embodiments, executing the instructions further causes the processing device to determine a transformation scheme associated with the at least one missing payload; apply the transformation scheme to the at least one missing payload, generating at least one transformed payload; and store the at least one transformed payload in the data partition.

In some embodiments, the data partition is stored within a data table and executing the instructions further causes the processing device to determine that a predetermined time period has elapsed and generate a second data partition within the data table.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
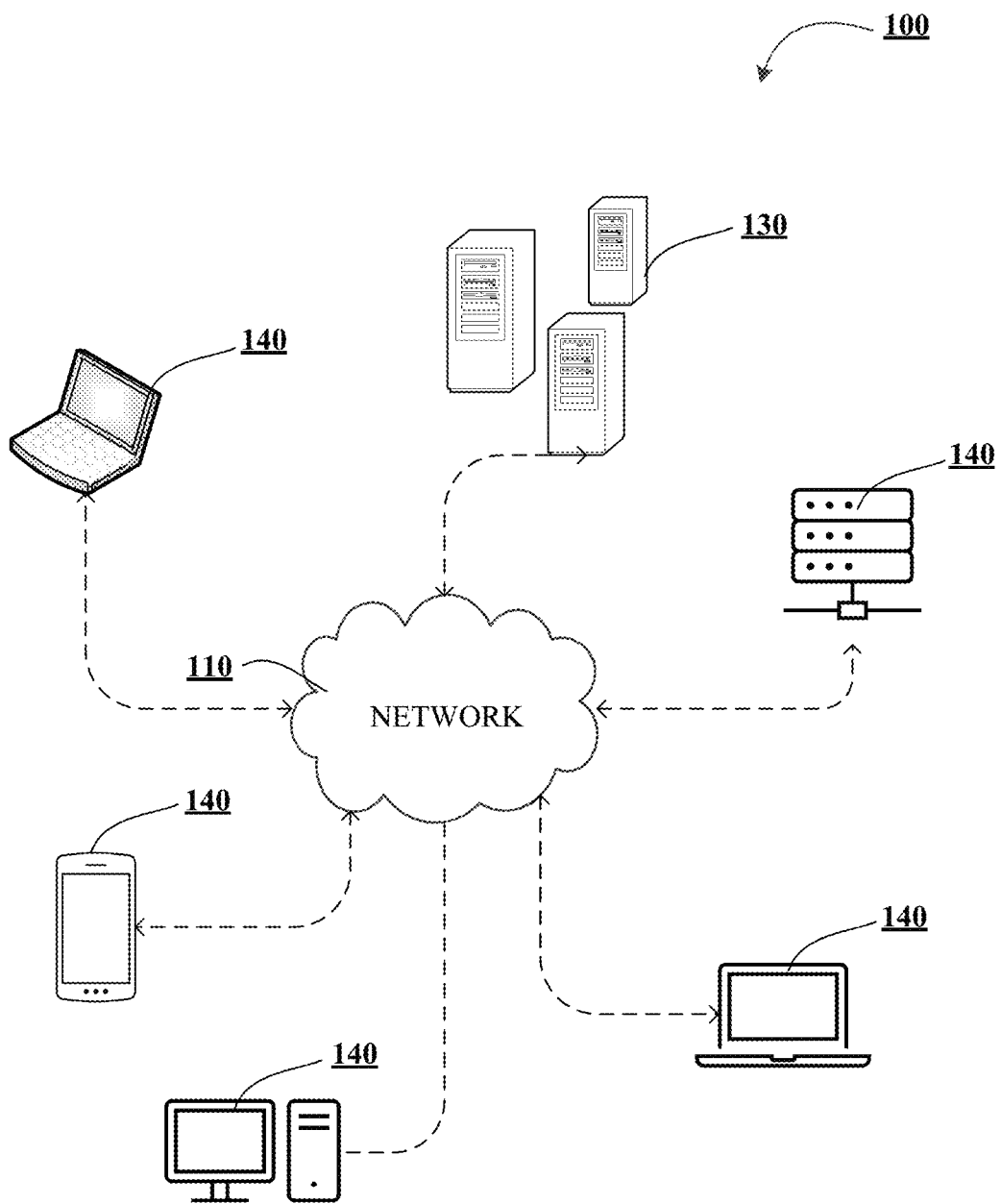
Figure 1B:
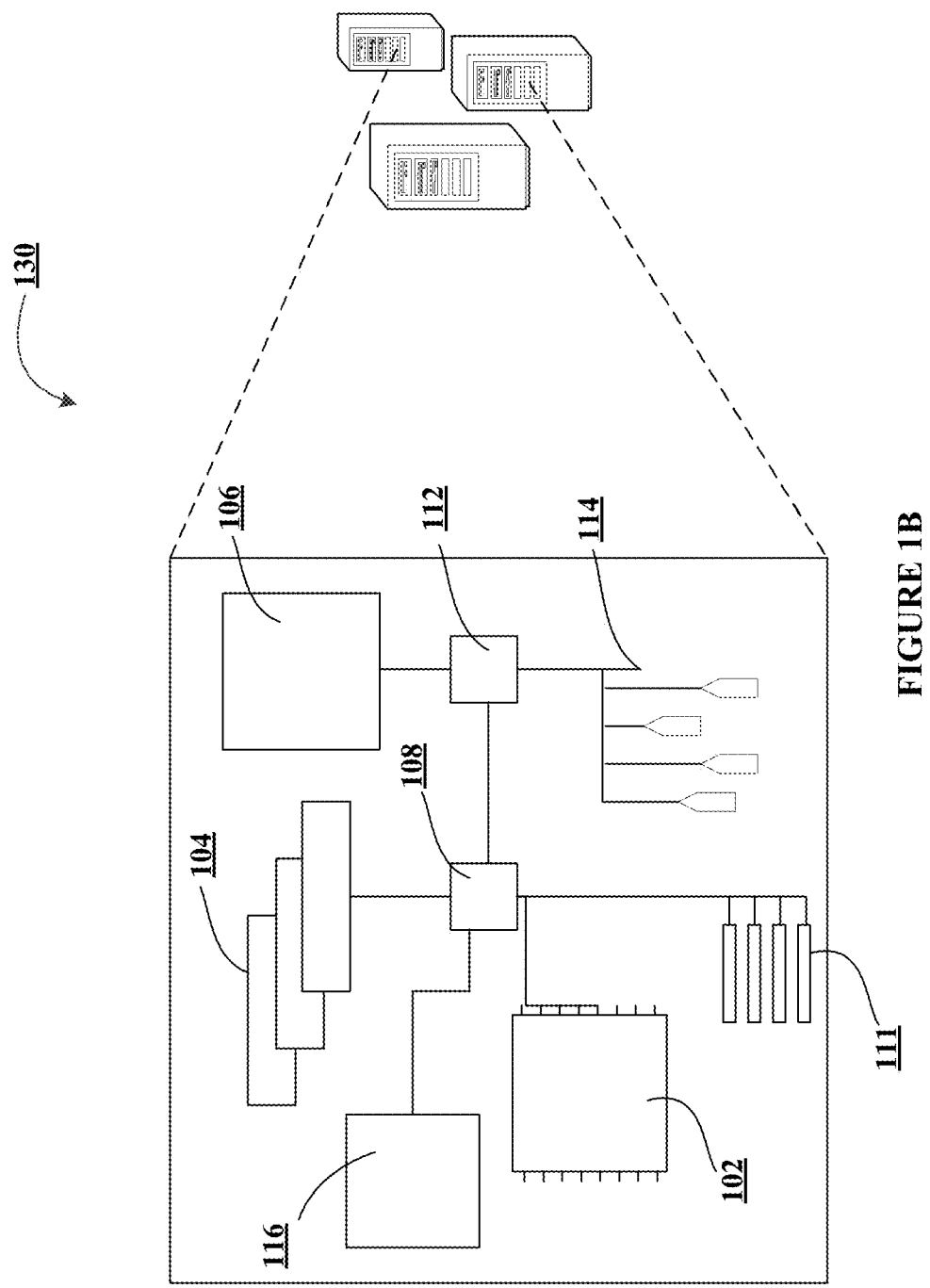
Figure 1C:
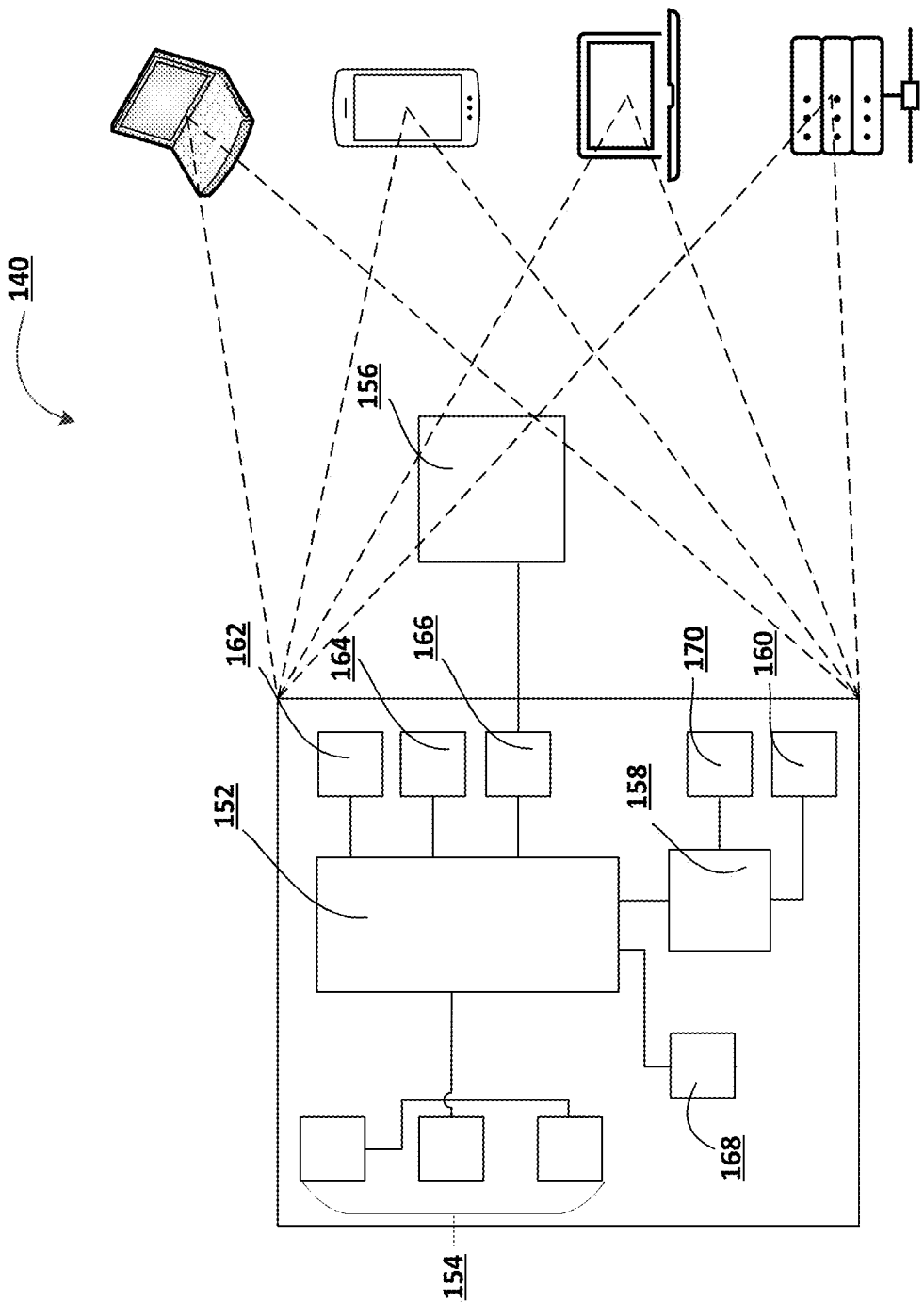
Figure 2:
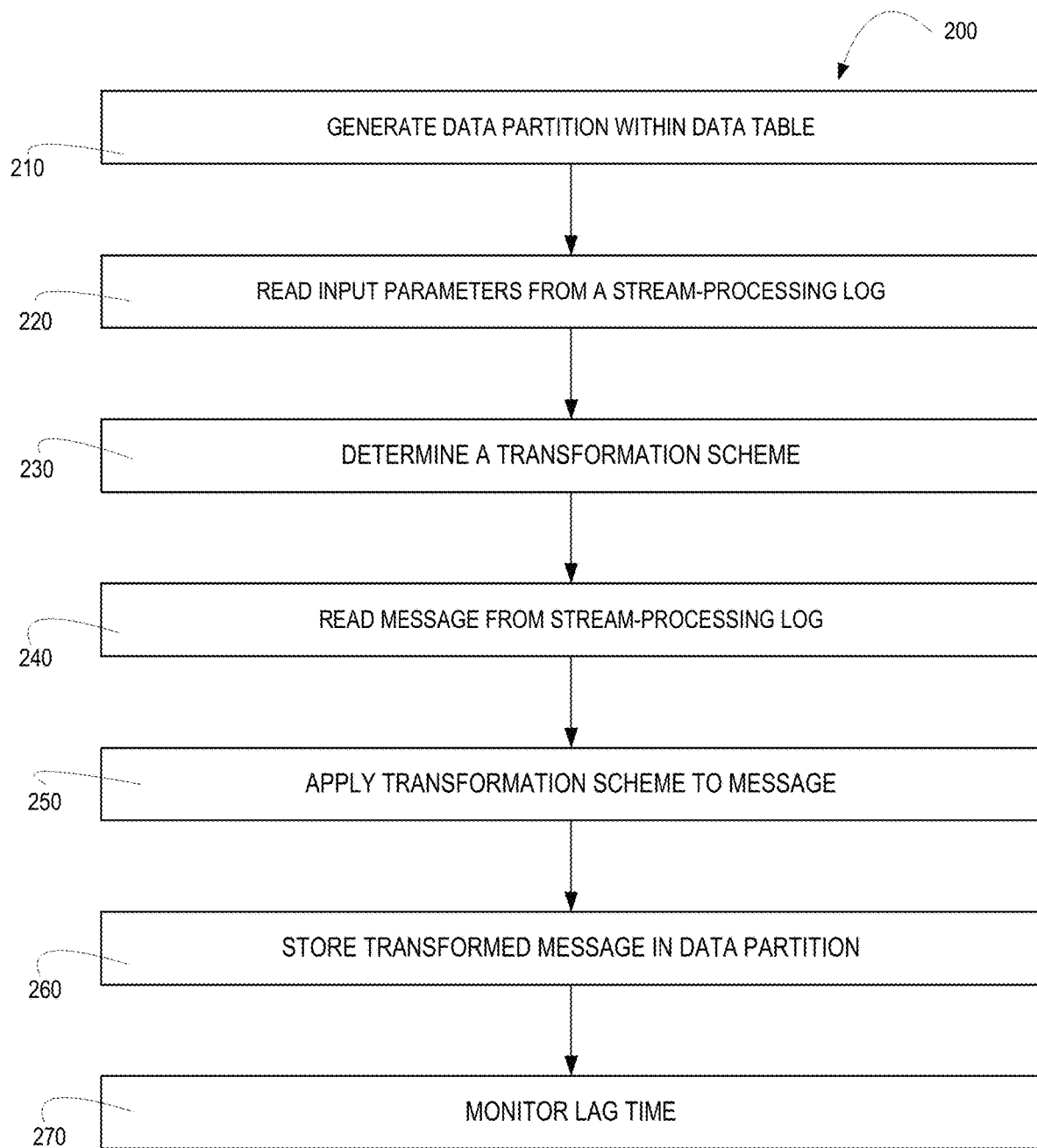
Figure 3:
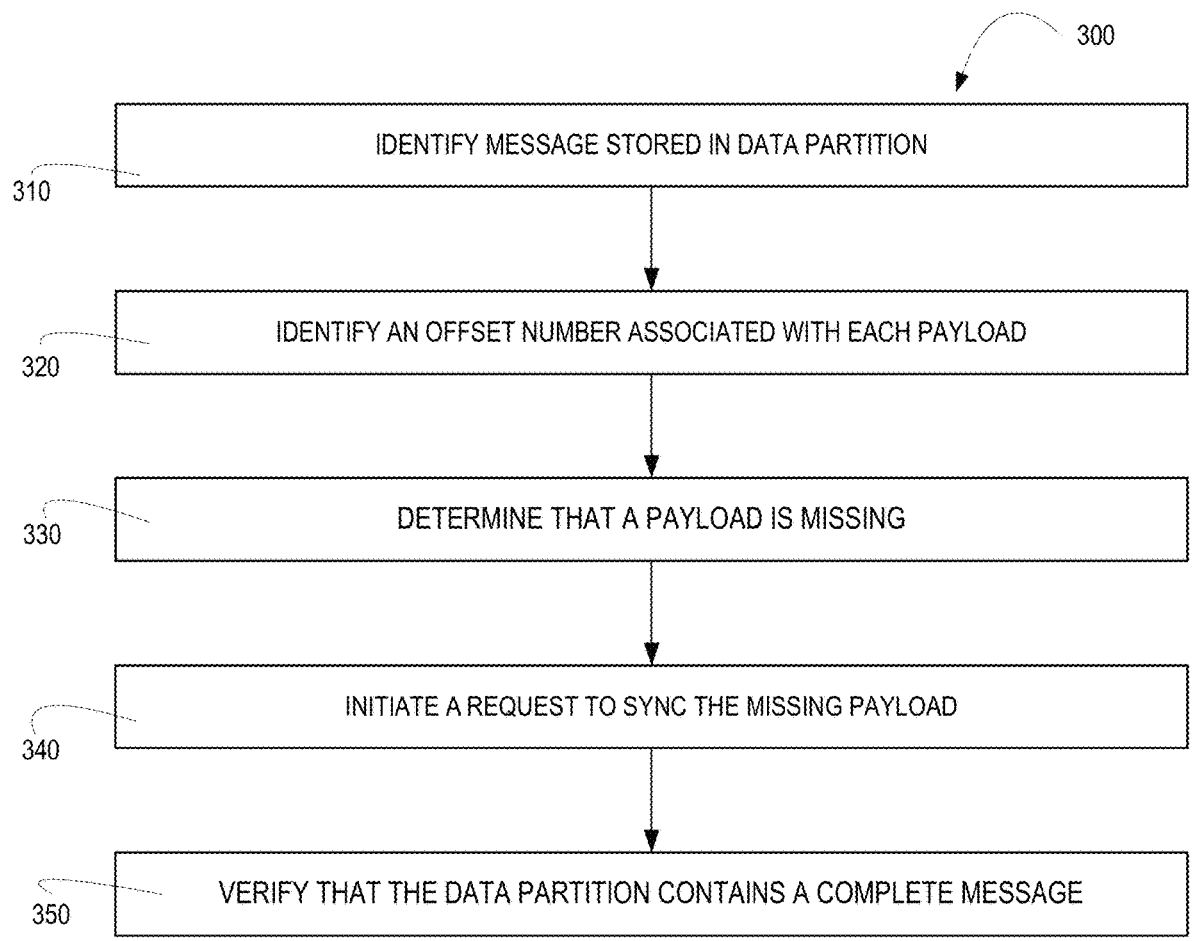

FIGS. 1A-1C illustrates technical components of an architecture for improved fault tolerance, in accordance with an embodiment of the disclosure;

FIG. 2 illustrates a process flow for improved fault tolerance, in accordance with an embodiment of the disclosure; and FIG. 3 illustrates a process flow for data reconciliation for improved fault tolerance, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In conventional networked computing systems, stream-processing software is utilized to handle real-time data feeds. For example, a stream-processing software may sort incoming data feeds into data logs, which are then consumed by various application servers within the computing system. However, this consumption process is susceptible to failure as application servers often fail to consume a full payload of data comprising a particular message. As such, a need exists for a streaming architecture with improved fault tolerance. The system provided herein solves the problem via a reliable streaming process, which regularly generates partitions within a series of data lakes. As streaming data is received, the payloads are synced into the different data lakes based on metadata associated with the streaming data. The system can then perform individual quality checks on each partition of data, enabling the system to continuously monitor data quality over time.

Another aspect of the proposed invention includes a "data quality check" process which the system performs on a particular partition of data. The process includes identifying an offset number assigned to each individual payload. Then, for each partition of data, the system identifies a maximum offset, a minimum offset, and a total offset count. If the difference between the maximum and minimum offsets exceeds the total offset count, then the system determines that some payload data is missing. The system then initiates a data reconciliation process to request the payload data associated with particular offset numbers and resyncs the data partition. This enables the system to automatically rebuild incomplete data sets without requiring manual intervention.

What is more, the present disclosure provides a technical solution to a technical problem. As described herein, the technical problem includes the failure of an application server to consume a full payload of data, resulting in "dropped messages" from a stream-processing log. The technical solution presented herein groups incoming payloads into discrete data partitions, each of which can be separately and automatically analyzed for completion. By analyzing one data partition at a time, the system reduces the computational resources required to continuously monitor for dropped messages. In particular, the claimed system reduces the amount of computing resources, such as processing resources, storage resources, network resources, and/or the like, that are being used, removes manual input and waste from the implementation of the solution, thus improving speed and efficiency of the process and conserving computing resources, and reduces network traffic and load on existing computing resources. Furthermore, the technical solution described herein uses a rigorous, computerized process to perform specific tasks and/or activities that were not previously performed, as analyzing a message for a particular missing payload was previously a manual process.

FIGS. 1A-1C illustrate technical components of an exemplary distributed computing environment 100 for improved fault tolerance in a streaming architecture, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for improved fault tolerance in a streaming architecture, in accordance with an embodiment of the disclosure. The process flow may begin at block 210, where the system may be configured to generate a data partition within a data table. In some embodiments, the data table may be one of a plurality of data tables, or data lakes, stored within a particular application server or end-point device. Each data table of the plurality of data tables may be configured to consume data from a stream-processing log and store the consumed data for access by the application server and/or a user of the end-point device. In some embodiments, the system may be configured to generate a data partition within a data table at regular intervals, such as once per day. Thus, the system may be configured to determine that a predetermined time period has elapsed, such as twenty-four hours, and may then generate a second data partition within the first data table. The system may use the data partitions for a variety of functions, such as ensuring that data within a particular partition is not accessed by the application server until it has been verified. Data partitions may also enable a data reconciliation process to be performed on only one partition of a data table, thus reducing the computational resources required to continuously monitor a data table.

The process flow may then continue to block 220, where the system may be configured to read input parameters from a stream-processing log. In some embodiments, the input parameters may comprise metadata associated with a particular message in a stream-processing log, such as a data topic, database name, table name, data format, batch interval, entity name, and/or the like.

The process flow may then continue to block 230, where the system may be configured to determine a transformation scheme for the particular message based on the input parameters. For example, in some embodiments, the input parameters may specify that the message is in a first, or native, data format, whereas the application server or end-point device may require or prefer a second, accessible, data format. Thus, the transformation scheme may comprise converting the message from the first data format to the second data format. Additionally or alternatively, the input parameters may specify that the message is associated with a particular data topic. Thus, the transformation scheme may comprise transforming the message into a format applicable to a particular use case associated with the data topic.

The process flow may then continue to block 240, where the system may be configured to read the message from the stream-processing log. In some embodiments, the message may comprise a plurality of data payloads, and the system may be configured to read each payload separately. The payloads are described in greater detail with respect to FIG. 3. The process flow may then continue to block 250, where as the system reads the message, the system may be further configured to apply the transformation scheme to the message, thus generating a transformed message.

The process flow may then continue to block 260, where the system may be configured to store the transformed message in a data partition. In some embodiments, the system may identify, based on the transformation scheme and the input parameters, a data table associated with the transformed message. The system may then store the transformed message within the most recent data partition of the data table. For example, in some embodiments, the message may be stored in a data table corresponding to a particular use case of the message. Additionally or alternatively, the message may be stored in a data table corresponding to a particular data format.

The process flow may then conclude at block 270, where the system may be configured to monitor a lag time associated with the message. For example, the system may monitor a lag time between reading the input parameters and storing the transformed message, and/or a lag time between reading the message and storing the transformed message. In some embodiments, the system may be configured to display, via a user interface of an end-point device, a dashboard. The dashboard may comprise data associated with a measured lag time, data trends associated with the system, error information, data associated with a data reconciliation process, system diagnostic information, and/or the like. In some embodiments, the system may be configured to determine that a lag time exceeds a predetermined value and may then transmit a notification to the end-point device and/or display an alert on the dashboard.

FIG. 3 illustrates a process flow 300 for data reconciliation for improved fault tolerance, in accordance with an embodiment of the disclosure. The process flow may begin at block 310, where the system may be configured to identify a message stored within a data partition. As described with respect to FIG. 2, the data partition may be located within a data table of a particular application server and/or end-point device. Each message stored within the data table may comprise a plurality of discrete data payloads. Each payload may comprise an offset number, wherein the offset numbers are sequentially ordered with respect to the payload's position within the complete message.

The process flow may then continue to block 320, where the system may be configured to identify the offset number associated with each payload of the stored message. Then, at block 330, the system may apply an algorithm to determine that a particular payload is missing from the stored message. Specifically, the system may determine, based on the offset numbers, that the message is incomplete. In some embodiments, the system may apply the algorithm by first identifying a minimum offset number and a maximum offset number of the offset numbers associated with the payloads of the stored message. The system may further identify a count of total distinct offset numbers and/or a count of total payloads. Next, the system may calculate a difference between the minimum offset number and the maximum offset number. The system may then add a value of one to the calculated difference and may then compare that result to the count of total distinct offset numbers and/or the count of total payloads. If the result is equal to both the count of total distinct offset numbers and the count of total payloads, the system may determine that the message stored within the data partition is a complete message. If the result is equal to the count of total distinct offset numbers but less than the count of total payloads, the system may determine that the message stored within the data partition contains duplicate payloads. If the result is greater than the count of total distinct offset numbers, the system may determine that the message stored within the data partition is incomplete (i.e., missing at least one payload). After determining that the message is incomplete, the system may then identify one or more missing offset numbers from the plurality of offset numbers, where the at least one missing payload is associated with the at least one missing offset number.

The process flow may then continue to block 340, where the system may automatically initiate a request to sync the at least one missing payload from the stream-processing log. Specifically, the system may automatically initiate a request to read data from the stream-processing log, where the data includes the at least one missing payload. Then, at block 350, the system may store the data from the stream-processing log within the data partition and verify that the data partition contains a complete message. In some embodiments, before storing the data, the system may determine a transformation scheme associated with the at least one missing payload and apply the transformation scheme to the at least one missing payload.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

To supplement the present disclosure, this application further incorporates entirely by reference the following commonly assigned patent application:

| U.S. Patent No. | U.S. patent application Ser. No. | Title | Filed On |
|---|---|---|---|
| US12,261,755B1 (Issued March 25, 2025) | 18/371,713 | STREAMING ARCHITECTURE FOR IMPROVED FAULT TOLERANCE | Sep. 22, 2023 |

What is claimed is:

1. A system for data reconciliation in a streaming architecture, the system comprising:
a processing device;
a non-transitory storage device containing instructions when executed by the processing device, causes the processing device to:
access a data partition within a data table, wherein the data table is configured to consume data from a stream-processing log and store the consumed data for access by an application server;
read one or more input parameters from the stream-processing log;
determine a first transformation scheme based on the one or more input parameters;
read a message from the stream-processing log, wherein the message comprises a plurality of payloads;
identify, for each payload of the plurality of payloads, an offset number;
determine, based on the identified offset numbers, that the message is incomplete;
automatically initiate a request to read data from the stream-processing log, wherein the data comprises at least one missing payload;
verify that the message is complete;
apply the first transformation scheme to the complete message; and
store the transformed message in the data partition.

2. The system of claim 1, wherein executing the instructions further causes the processing device to:
identify a minimum offset number, a maximum offset number, and a count of total distinct offset numbers;
calculate a difference between the minimum offset number and the maximum offset number;
increase the calculated difference by a value; and
determine that the increased calculated difference is greater than the count of total distinct offset numbers.

3. The system of claim 1, wherein executing the instructions further causes the processing device to:
identify at least one missing offset number.

4. The system of claim 3, wherein the at least one missing payload is associated with the at least one missing offset number.

5. The system of claim 1, wherein executing the instructions further causes the processing device to:

store the data from the stream-processing log within the data partition.

6. The system of claim 1, wherein executing the instructions further causes the processing device to:
determine a second transformation scheme associated with the at least one missing payload;
apply the second transformation scheme to the at least one missing payload, generating at least one transformed payload; and
store the at least one transformed payload in the data partition.

7. The system of claim 1, executing the instructions further causes the processing device to:
determine that a predetermined time period has elapsed; and
generate a second data partition within the data table.

8. A computer program product for data reconciliation in a streaming architecture, the computer program product comprising a non-transitory computer-readable medium comprising code causing an apparatus to:
access a data partition within a data table, wherein the data table is configured to consume data from a stream-processing log and store the consumed data for access by an application server;
read one or more input parameters from the stream-processing log;
determine a first transformation scheme based on the one or more input parameters;
read a message from the stream-processing log, wherein the message comprises a plurality of payloads;
identify, for each payload of the plurality of payloads, an offset number;
determine, based on the identified offset numbers, that the message is incomplete;
automatically initiate a request to read data from the stream-processing log, wherein the data comprises at least one missing payload;
verify that the message is complete;
apply the first transformation scheme to the complete message; and
store the transformed message in the data partition.

9. The computer program product of claim 8, wherein the code further causes the apparatus to:
identify a minimum offset number, a maximum offset number, and a count of total distinct offset numbers;
calculate a difference between the minimum offset number and the maximum offset number;
increase the calculated difference by a value; and
determine that the increased calculated difference is greater than the count of total distinct offset numbers.

10. The computer program product of claim 8, wherein the code further causes the apparatus to:
identify at least one missing offset number.

11. The computer program product of claim 10, wherein the at least one missing payload is associated with the at least one missing offset number.

12. The computer program product of claim 8, wherein the code further causes the apparatus to:
store the data from the stream-processing log within the data partition.

13. The computer program product of claim 8, wherein the code further causes the apparatus to:
determine a second transformation scheme associated with the at least one missing payload;
apply the second transformation scheme to the at least one missing payload, generating at least one transformed payload; and
store the at least one transformed payload in the data partition.

14. The computer program product of claim 8, wherein the code further causes the apparatus to:
determine that a predetermined time period has elapsed; and
generate a second data partition within the data table.

15. A method for data reconciliation in a streaming architecture, the method comprising:
accessing a data partition within a data table, wherein the data table is configured to consume data from a stream-processing log and store the consumed data for access by an application server;
reading one or more input parameters from the stream-processing log;
determining a first transformation scheme based on the one or more input parameters;
reading a message from the stream-processing log, wherein the message comprises a plurality of payloads;
identifying, for each payload of the plurality of payloads, an offset number;
determining, based on the identified offset numbers, that the message is incomplete;
automatically initiating a request to read data from the stream-processing log,
wherein the data comprises at least one missing payload;
verifying that the message is complete;
applying the first transformation scheme to the complete message; and
storing the transformed message in the data partition.

16. The method of claim 15, wherein the method further comprises:
identifying a minimum offset number, a maximum offset number, and a count of total distinct offset numbers;
calculating a difference between the minimum offset number and the maximum offset number;
increasing the calculated difference by a value; and
determining that the increased calculated difference is greater than the count of total distinct offset numbers.

17. The method of claim 15, wherein the method further comprises:
identifying at least one missing offset number.

18. The method of claim 17, wherein the at least one missing payload is associated with the at least one missing offset number.

19. The method of claim 15, wherein the method further comprises:
determining a second transformation scheme associated with the at least one missing payload;
applying the second transformation scheme to the at least one missing payload, generating at least one transformed payload; and
storing the at least one transformed payload in the data partition.

20. The method of claim 15, wherein the method further comprises:
determining that a predetermined time period has elapsed; and
generating a second data partition within the data table.

* * * * *